UNITED STATES PATENT OFFICE.

F. W. GOESSLING, OF BUFFALO, NEW YORK, ASSIGNOR TO H. F. BRIGGS, L. BRADLEY, AND HIMSELF, OF SAME PLACE.

IMPROVEMENT IN THE MANUFACTURE OF SUGAR.

Specification forming part of Letters Patent No. 45,561, dated December 20, 1864.

*To all whom it may concern:*

Be it known that I, FREDERICK W. GOESSLING, of the city of Buffalo, county of Erie, and State of New York, (assignor to HENRY F. BRIGGS, LYMAN BRADLEY, and myself,) have invented or produced a new Compound Sugar; and I do hereby declare that the following is a full and complete description of the manufacture or compounding thereof.

The nature of this invention relates to the manufacture of a new article of sugar from a combination of cane-sugar with corn-sirup.

I take a sirup made from Indian corn by any known process of making corn-sirup or corn-sugar, the process being carried to that point where the sirup is purified and rendered in a condition to granulate or crystallize. I also take a quantity of cane-sugar (any kind or quality of cane-sugar will answer the purpose) and dilute it or reduce it to a liquid sirup, and purify the sirup by any known process of purifying cane-sugars and render it in a suitable condition for crystallization. These two sirups are then mixed or combined together for crystallization and conversion into a new compound sugar, the crystallizing process being completed and the new sugar perfected after the combination of the two sirups. The crystallizing process may commence in each sirup before the two are combined, and be completed after their combination. After the mixture of the two sirups, as above stated, the mixture will be in a thick semi-liquid state, and it is then transferred to the molds for the completion of the crystallizing process and the further treatment by "liquoring" in a common manner. The proportion of cane-sugar or cane-sirup used in combination with the corn-sirup is not definite or material, as a larger or smaller quantity will effect the purpose. The object and effect of this combination is to induce the whole mass to crystallize in the same manner that cane-sugar does, and to give the whole the taste and qualities of cane-sugar.

I also propose in some cases to use the sirups produced from wheat and other cereals, as a substitute for Indian-corn sirup, in combination with cane-sugar, the same and for the same purpose as above stated.

What I claim as my invention, and desire to secure by Letters Patent, is—

A new and improved compound sugar, made by a combination of cane-sugar or cane-sirup with corn-sirup, substantially as set forth.

FREDK. W. GOESSLING.

Witnesses:
   E. B. FORBUSH,
   W. H. FORBUSH.